United States Patent [19]

Zeibig

[11] 4,331,408

[45] May 25, 1982

[54] PHOTOGRAPHIC BELLOWS UNIT

[75] Inventor: Siegfried Zeibig, Dresden, German Democratic Rep.

[73] Assignee: VEB Pentacon Dresden Kamera- und Kinowerke, Dresden, German Democratic Rep.

[21] Appl. No.: 66,746

[22] Filed: Aug. 15, 1979

[30] Foreign Application Priority Data

Aug. 30, 1978 [DD] German Democratic Rep. ... 207552

[51] Int. Cl.$^3$ .............................................. G03B 17/04
[52] U.S. Cl. .................................................. 354/191
[58] Field of Search ............................... 354/191, 187

[56] References Cited

U.S. PATENT DOCUMENTS

| | | | |
|---|---|---|---|
| 474,708 | 5/1892 | Wiest | 354/191 X |
| 1,731,198 | 10/1929 | Kawatch | 354/187 X |
| 2,005,417 | 6/1935 | Fuerst | 354/187 |

*Primary Examiner*—Donald A. Griffin
*Attorney, Agent, or Firm*—James C. Wray

[57] ABSTRACT

The photographic bellows unit is provided with a device for indicating the distance between the standards which support the bellows and are adjustable relative to each other. There are arranged between the standards (2;3) two scissors-shaped levers (8;13) which are hingedly inter-connected at one lever end and whose other end is rotatably hinged to respectively one of the standards (2;3). An index (15) is arranged on one pivotable lever (13) and a measuring scale is arranged on the other pivotable lever (8).

In this manner it is possible to avoid the computational determination of the respective distance between the two standards as the indicating device allows the distance between the two standards to be read directly irrespective of the position of the standards with respect to the guide.

2 Claims, 2 Drawing Figures

PHOTOGRAPHIC BELLOWS UNIT

BACKGROUND TO THE INVENTION

The invention relates to a bellows unit with a device indicating the distance between the standards which are adjustable relative to each other.

STATEMENT OF PRIOR ART

On known bellows units, there are provided measuring scales which are arranged on the guide and which begin at the stationary standard and which are probed by the pointer index of the movable standard. If it is desired to move both standards relative to each other and with respect to the guide, then the distance between the two standards has to be determined computationally by forming the difference.

OBJECT OF THE INVENTION

The object of the invention is the avoidance of the computational determination of the respective distance between the two standards by way of a device which allows the distance between the two standards to be directly read irrespective of the position of the standards with respect to the guide.

SUMMARY OF THE INVENTION

According to the invention, this is brought about in that there are arranged between the standards two scissors-shaped levers which are hingedly connected to each other at one lever end and whose other end is rotatably hinged to respectively one of the standards and in that there is arranged an index of one pivotable lever and a measuring scale on the other pivotable lever. Expediently, the levers are designed as hollow sections, in whose hollow spaces electric cables are inserted so that there is always provided between the standards, which are movable relative to each other, an electric connection which may be desired.

BRIEF DESCRIPTION OF DRAWINGS

The invention will be explained with reference to an illustrated and described exemplified embodiment. In the drawing

DESCRIPTION OF PREFERRED EMBODIMENT

Figure 1:
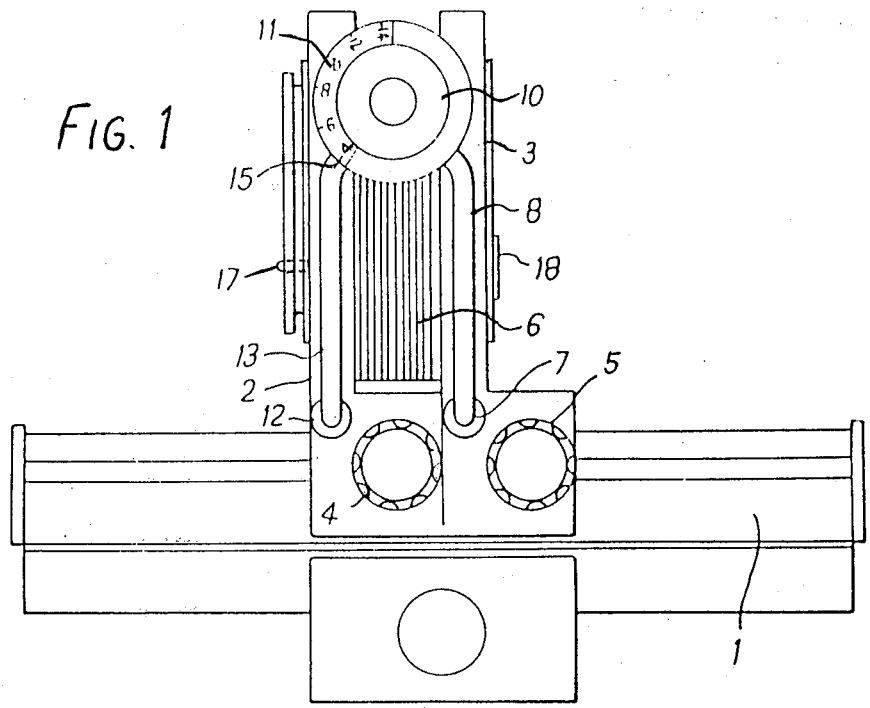
FIG. 1 shows the bellows unit with the bellows compressed.
Figure 2:
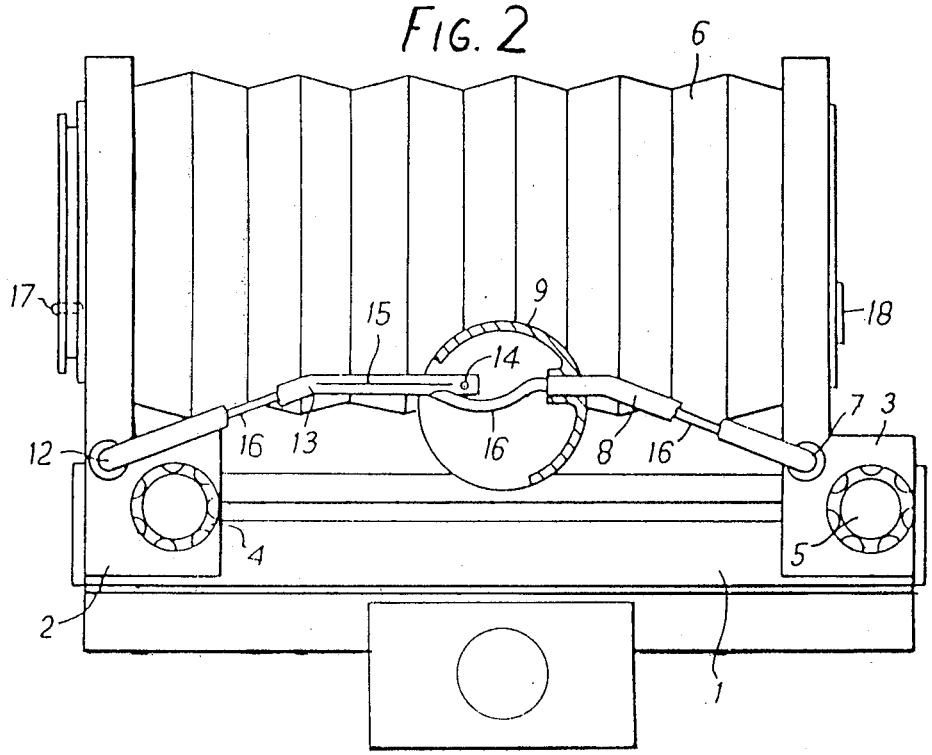
FIG. 2 shows the bellows unit with the bellows extended.

The standards 2 and 3 are arranged on top of the guide 1 so as to be movable and to be secured in position by means of the clamping screws 4 and 5. The bellows 6 is provided between the standards 2 and 3. The lever 8 is mounted on the standard 3 by means of the joint 7. The capsule 9 is fastened to the other end of the lever 8. The capsule 9 is shut by the cover 10 which carries the measuring scale 11. The lever 13 is rotatably mounted on the other standard 2 by means of the joint 12. The other end of the lever 13 is rotatably connected to the capsule 9 by the pin 14 and carries the index 15. The levers 8 and 13 are made from hollow section; in the hollow space of the levers 8 and 13, there is located the cable 16 which, within the capsule 9, leaves the lever 8 and penetrates into the other lever 13. The contact pin 17 is provided on the standard 2 and the contact plate 18 is provided on the other standard 3. The contact pin 17 and the contact plate 18 are electrically interconnected by the cable 16.

The mode of operation of the arrangement is the following:

When the clamping screws 4 and 5 have been loosened, it is possible to displace the standards 2 and 3 relative to each other along the guide 1. During this process, the levers 8 and 13 are expanded one from the other to a greater or lesser degree, depending on the distance between the standards 2 and 3. During this process, the index 15 slides with respect to the measuring scale 11 and directly indicates the scale value which corresponds to the respective distance between the standards 2 and 3. The electric connection between the contact pin 17 and the contact plate 18 is maintained by the cable 16 in each relative position of the standards 2 and 3.

I claim:

1. In a photographic bellows unit having a pair of standards which are adjustable relative to each other, the provision of a device indicating the distance between the standards comprising:
    (a) two scissors-shaped levers arranged between the standards which are hingedly interconnected at one lever end and whose other end is rotatably hinged to respectively one of the standards,
    (b) an index arranged on one pivotable lever, and
    (c) a measuring scale is arranged on the other pivotable lever.

2. A bellows unit according to claim 1, wherein the levers are designed as hollow sections and in that electric cables are inserted in the hollow spaces.